United States Patent [19]

Briggs

[11] 4,370,561
[45] Jan. 25, 1983

[54] VEHICLE MULTIPLEX SYSTEM

[75] Inventor: George R. Briggs, Princeton, N.J.

[73] Assignee: RCA Corporation, New York, N.Y.

[21] Appl. No.: 211,343

[22] Filed: Nov. 28, 1980

[51] Int. Cl.³ .............................................. G08C 15/12
[52] U.S. Cl. .......................................... 307/9; 370/85
[58] Field of Search ......................... 307/9, 10 R, 40; 370/85, 100

[56] References Cited

U.S. PATENT DOCUMENTS

| | | | |
|---|---|---|---|
| 3,651,454 | 3/1972 | Venema et al. | 340/52 F |
| 3,814,861 | 6/1974 | Robbins | 370/85 |
| 3,846,639 | 11/1974 | Veda et al. | 307/9 |
| 4,096,355 | 6/1978 | Rothauser et al. | 370/100 |

*Primary Examiner*—Michael L. Gellner
*Assistant Examiner*—James L. Dwyer
*Attorney, Agent, or Firm*—Samuel Cohen; Raymond E. Smiley

[57] ABSTRACT

A vehicle multiplex system includes a power conductor for conveying electrical power to power-operated units on the vehicle, and a single signal conductor for controlling the connections of power to power-operated units. A multiplex timing unit applys a tri-state timing waveform to the signal conductor. Each of a plurality of control signal transmitters is operative in response to a physical command to apply a corresponding control signal to the signal conductor during a control time period in a channel interval assigned to the particular transmitter. And, each of a plurality of control signal receivers is operative to control the connection of electrical power from the power conductor to a power-operated unit in response to a control signal received from the signal conductor during a control time period in a channel interval assigned to the particulate receiver.

10 Claims, 4 Drawing Figures

VEHICLE MULTIPLEX SYSTEM

This invention relates to a multiplex system for controlling the application of electrical power to power-operated units on an automotive vehicle, or the like.

It is the common practice in automobiles to apply power to the headlights, for example, by means of a wire extending from the battery voltage bus, through a switch positioned conveniently for operation by the driver, to the headlights. A separate wire is similarly used from the battery bus through a respective control switch to each other power-operated unit in the automobile. The present practice is increasingly unsatisfactory because of the cost of manufacturing and installing the large number of wires needed, and a lack of space for the wires in fuel-efficient automobiles of small size and low weight. An electrical bus system is needed in which a single power conductor conveys battery power to the vicinity of all power operated units in the vehicle, and a single control conductor conveys control signals from all control switches to inexpensive semiconductor control circuits, each near a power-operated unit, to control the connections of battery power to the respective units.

According to an example of the invention, a vehicle multiplex system includes a power conductor for conveying electrical power to power-operated units on the vehicle, and a single signal conductor for controlling the connections of power to power-operated units. A multiplex timing unit applies a tri-state timing waveform to the signal conductor. Each of a plurality of control signal transmitters is operative in response to a physical command to apply a corresponding control signal to the signal conductor during a control time period in a channel interval assigned to the particular transmitter. And, each of a plurality of control signal receivers is operative to control the connection of electrical power from the power conductor to a power-operated unit in response to a control signal received from the signal conductor during a control time period in a channel interval assigned to the particular receiver.

Figure 1:
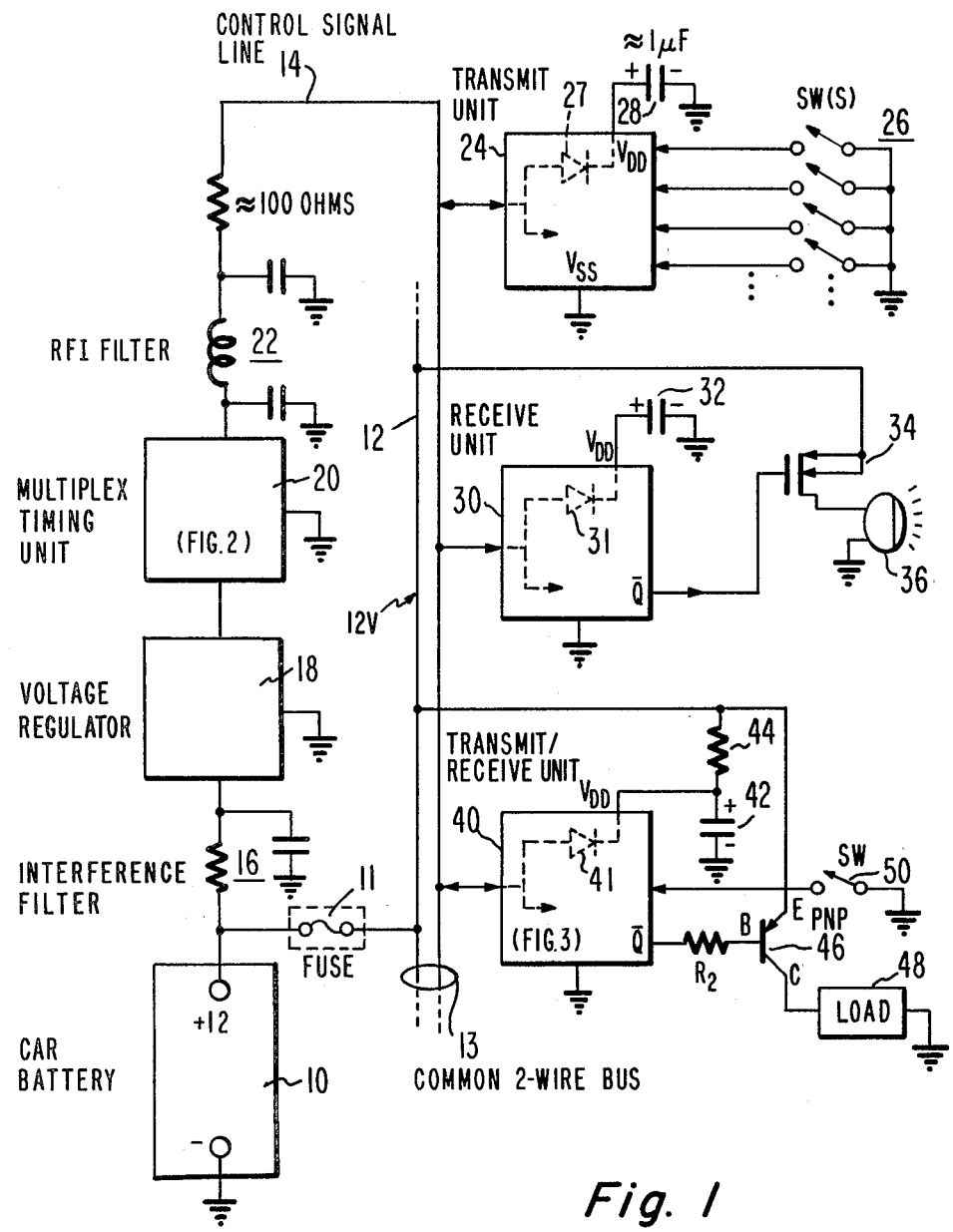
FIG. 1 is a block diagram of a vehicle multiplex system according to the invention.

In the vehicle multiplex system of FIG. 1, a 12-volt automobile battery 10 supplies current through a fuse 11 to the 12-volt power conductor 12 of a two-wire bus 13 which includes also a control signal time line conductor 14. The battery 10 also supplies power through a conventional interference filter 16 and a conventional voltage regulator 18 to a multiplex timing unit 20 (shown in detail in FIG. 2) from which a multiplex timing waveform is passed through a conventional radio-frequency-interference suppression filter 22 to the control signal line or conductor 14. The automobile chassis and body constitute the ground return path for both the 12-volt battery conductor 12 and the control signal line conductor 14.

The control signal line conductor 14 is connected to a control signal transmitter or transmit unit 24 operating in response to command switches 26 to apply corresponding control signals onto the control signal line 14. The switches 26 may, for example, be switches located on the steering column of the automobile for controlling turn signals, windshield wipers, etc. Control signals from transmitter 24 are transmitted over control signal line 14 to one or more receive units to be described. The transmitter 24 is a semiconductor unit which derives its operating d-c bias potential from the control signal line 14 by means of a rectifier diode 27 and a storage capacitor 28. The circuitry in unit 24 will be described in connection with a description of FIG. 3. The multiplex system of an automobile will normally have a plurality of transmit units, like unit 24, connected to the control signal line 14.

The control signal line 14 is also connected to a receive unit 30 which obtains transistor circuit bias power from control signal line 14, rectifier 31 and capacitor 32. The receive unit 30 responds to a control signal received over control signal line 14 to produce a signal Q which is applied to the gate electrode of a PMOS transistor 34 to connect battery power from battery power line 12 to a load such as a lamp 36. The circuitry of receive unit 30 may be as shown by the receive portion of FIG. 3 to be described. There normally will be a number of receive units 30 on a vehicle.

Finally, FIG. 1 also shows a combination transmit/receive unit 40 connected to the bus 13 including the control signal line 14 and to the battery power line 12. The combination unit 40 is capable of performing the function of a transmit unit 24 and the function of a receive unit 30, and is more economical than two units because a major portion of the combination circuit is used for both the transmit function and the receive function. The transmit/receive unit 40 may receive all of its bias energy from the control signal line 14 through a diode 41 and a capacitor 42, or may receive part of its bias energy from the battery line 12 via a resistor 44. The additional bias energy may be needed to provide base current to a PNP transistor or Darlington switch 46 used to connect battery power line 12 to a load 48. The bias voltage $V_{DD}$ will normally be less than the 12 volts obtained from battery 10, and may be about 4 to 5 volts maintained by a voltage regulator (not shown). The transmit portion of the unit 40 operates in response to a manual operation of a command switch 50.

Figure 2:
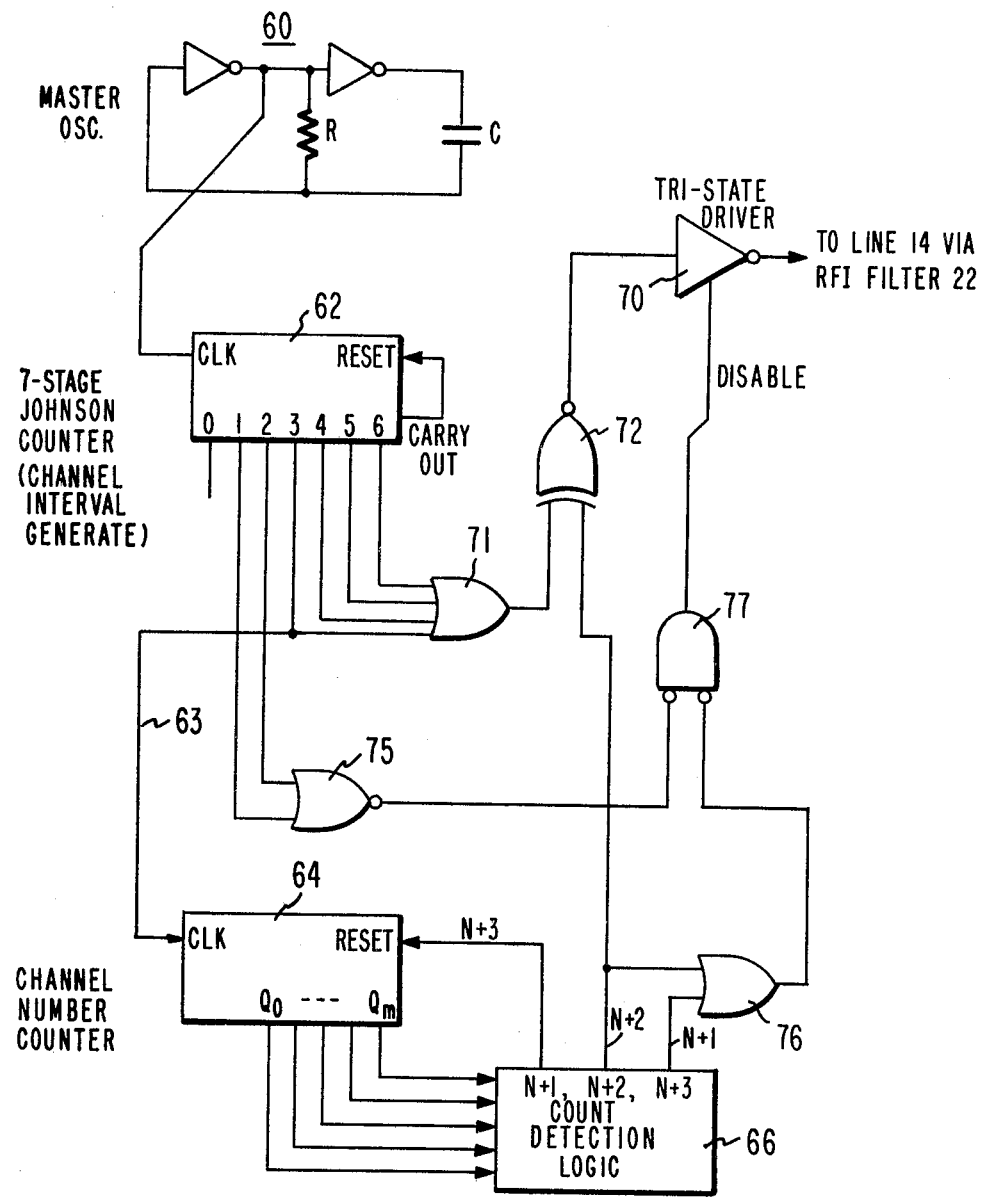
FIG. 2 is a diagram of a multiplex timing unit useful in the system of FIG. 1.

Having described the overall system as shown in FIG. 1, reference is now made to FIG. 2 for a description of the detailed circuit of a multiplex timing unit useful in the box 20 of FIG. 1. A master oscillator may be a conventional unit producing a square-wave output at about 17,500 Hz as shown by waveform A of FIG. 4. (The oscillator, and all other units to be described, are supplied with $+V_{DD}$ and $V_{SS}$ bias voltages by connections not shown). The output of oscillator 60 is applied to the clock input of a divide-by-seven Johnson sub-interval counter 62. The count number 3 output of counter 62 is connected over path 63 to the clock input of a channel-number counter 64, which in the exemplary system being described, may count from zero to 63 in order to define channel intervals for sixty-four channels between system master timing intervals. Outputs of counter 64 are connected to a count detection logic unit 66 having outputs for counts $N+3=65$, $N+2=64$ and $N+1=63$, where N is the number, such as 60, of useful control channels. A plurality of logic gates are connected from outputs of a sub-interval counter 62 and outputs of channel count detection logic 66 to inputs of a tri-state driver 70 which may be a Type CD4502B integrated circuit unit made by RCA Corporation.

Figure 4:
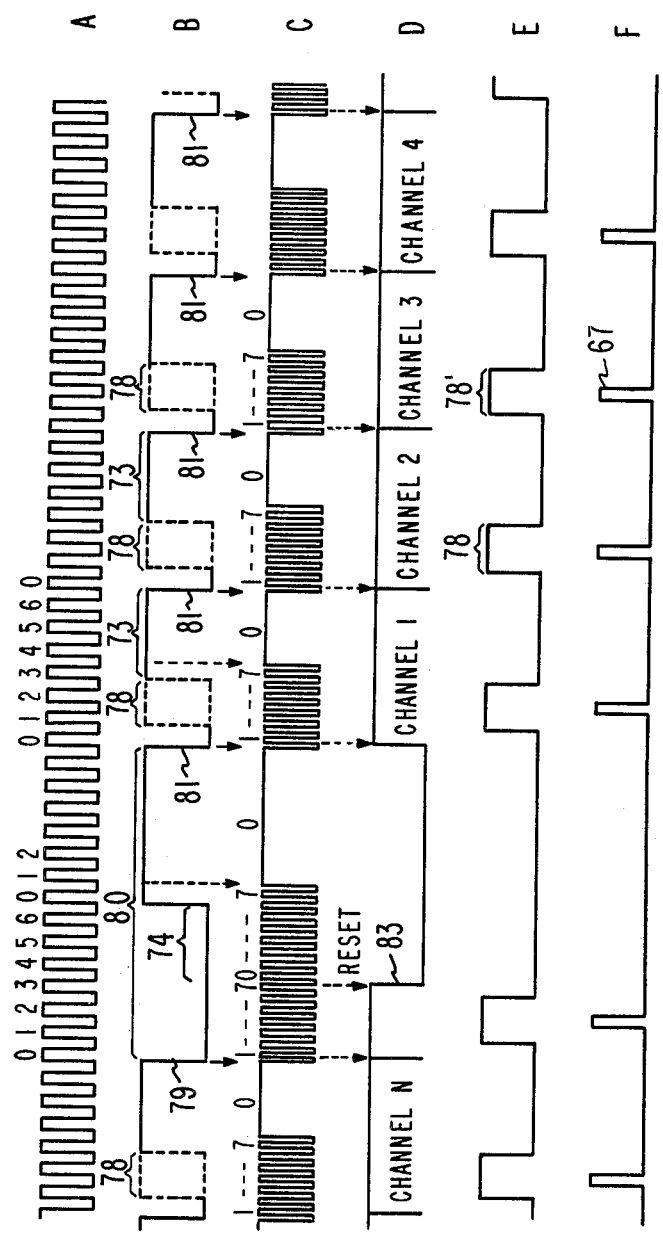
FIG. 4 is a chart of voltage waveforms which will be referred to in describing the operation of the apparatus of FIGS. 1, 2 and 3.

The output of the driver 70 is a tri-state timing waveform B shown in FIG. 4 in which a transition occurs once per seven cycles of the master oscillation of FIG. 7A, or at a rate of 17,500÷7=2,500 transitions per second with a spacing of 400 microseconds between transitions. Outputs 3, 4, 5 and 6 of counter 62 are connected through "or" gate 71 and exclusive "nor" 72 to the driver 70 to produce the positive or high output levels 73 in FIG. 4B, except at time 74 when prevented by an N+2 signal applied to gate 72. "Nor" gate 75, "or" gate 76 and negative logic "and" gate 77 cooperate to apply disable signals to driver 70 during time periods 78 in FIG. 4B. When the driver is thus disabled, the voltage on control signal line 14 is allowed to float and to be affected by a control signal from a transmitter unit 24, as will be described. The connections of the logic gates also cause the wave-form B to have a distinctive master timing interval 80. In the example being described, there are sixty-two successive channel intervals between two master timing intervals. It will be understood that a tri-state timing waveform having the characteristics of waveform B in FIG. 4 can be produced by any number of logic arrangements differing somewhat from the specific arrangement shown in FIG. 2. Each complete cycle of the waveform B has the important features of a master timing interval 80 followed by N channel intervals, where N is the number of control channels in the multiplex system. Each channel interval includes a period 78 when the waveform voltage is allowed to float. At all other times the multiplex timing unit holds the voltage on the control signal line 14 at a high or a low value with a low impedance of about 100 ohms which tends to prevent noise voltages from being induced on the line.

Figure 3:
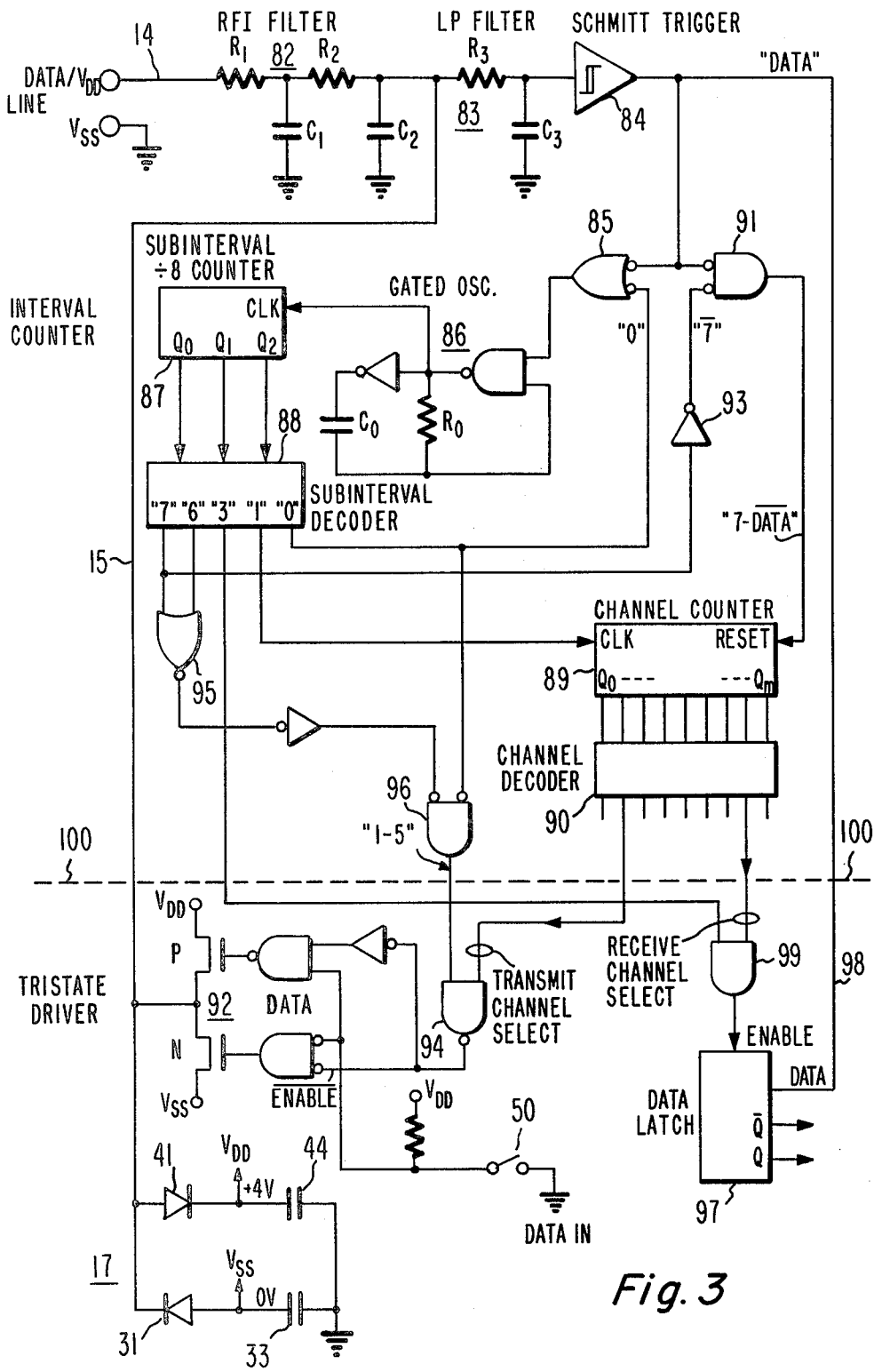
FIG. 3 is a diagram of a transmit/receiver unit useful in the system of FIG. 1.

Reference is now made to FIG. 3 for a description of the details of a combination transmit/receive circuit useful in the box 40 in the system of FIG. 1. The control signal line 14 is connected in the transmit/receive unit 40 through a radio-frequency-interface-suppression filter 82 and over a line 15 to a power supply circuit 17 which rectifies the alternating control signal on lines 14 and 15, and produces a direct-current bias voltage utilized by all the circuits in FIG. 3. A $V_{DD}$ voltage of about +4 volts is produced by diode 41 and capacitor 44. A $V_{SS}$ voltage of zero volts is maintained at the junction point between diode 31 and capacitor 33. The diode 31 and capacitor 33 are included for the purpose of protecting the system from total failure in case a transistor in the driver 92 (to be described) becomes shorted.

A control signal path at the output of radio-frequency-interference-suppression filter 82, is provided through a low-pass filter 83, a Schmitt trigger 84, and a negative logic "or" gate 85, to the control input of a gated oscillator 86. This oscillator may have a frequency of about 27,000 Hz. The output of oscillator 86 is applied to the clock input of a divide-by-eight sub-interval counter 87. A sub-interval decoder 88 receptive to the output of counter 87 has eight output lines 0 through 7, and one of these output lines is energized at a time depending on the count in counter 87. The "0" output of decoder 88 is returned to the oscillator 86 to normally turn it off after eight cycles, as shown by waveform C in FIG. 4. The "1" output of sub-interval decoder 88 is connected to the clock input of a channel counter 89 providing outputs to a channel decoder 90. The "7" output of sub-interval decoder 88 is connected through an inverter 93 to an input of a negative logic "and" gate 91 which is also receptive to the output of Schmitt trigger 84 and which provides an output to the reset input of channel counter 89.

What has thus far been described above the dashed line 100 in FIG. 3 is a channel synchronizing means which responds to the waveform B of FIG. 4 and controls the timing of a control signal transmission from the transmitter to the control line 14, and the time when the receiver is receptive to a control signal on the line 14.

The transmitter portion of the combination transmitter/receiver of FIG. 3 includes a tri-state driver 92, which may be the same as the tri-state driver 70 in FIG. 2, and a manual data input switch 50 connected to control the high or low voltage level supplied by the tri-state driver 92 to the control signal line 14. The tri-state driver 92 is enabled to transmit the command determined by switch 50 during a sub-interval of a predetermined one of the sixty-two channel intervals. The driver 92 is enabled by a signal from "nand" gate 94 having an input from channel decoder 90, and, an input via "nor" gate 95 and negative logic "and" gate 96, from sub-interval decoder 88.

The receive portion of the combination transmitter/receiver of FIG. 3 includes a data latch 97 to which control signals are connected over line 98 from control signal line 14, after regeneration by Schmitt trigger 84. The latch is enabled to receive and latch a high or a low control signal by an enabling signal from an "and" gate 99 having an input from channel decoder 90 and an input from output "3" of sub-interval decoder 88.

The transmit unit 24 in FIG. 1 includes all the circuitry of FIG. 3 except the receive portion including latch 97 and gate 99. The receive unit 30 in FIG. 1 includes all the circuitry of FIG. 3 except the transmit portion including tri-state driver 92 and associated logic gates. From the point of view of mass production of large quantities of a single type of unit, it may be more economical for the system to employ solely the combination transmit/receive units as shown in FIG. 3 at all locations, including those where solely a transmit function is needed, and those where solely a receive function is needed.

In the operation of the system of FIG. 1, the multiplex timing unit 20 includes a master oscillator 60 shown in FIG. 2 and having an output A as shown in FIG. 4, and counters, logic gates and a tri-state driver to apply a multiplex timing waveform to the signal control line 14 of FIG. 1. The timing waveform shown at B in FIG. 4 includes a master timing interval 80 followed by a plurality, such as sixty-two, of channel intervals. The master timing interval begins with a transition 79 from the high voltage level to the low voltage level, and each channel interval begins with a similar transistion 81. Each channel interval includes a period 78 when the tri-state driver 70 is disabled so that the voltage on the control signal line 14 can float and assume a high or a low control voltage level as provided by a transmit unit.

When the multiplex timing waveform B is received over control signal line 14 by a transmit/receive unit as shown in FIG. 3, the transitions 79 and 81 in the waveform start the gated oscillator 86 to produce the oscillations shown by waveform C in FIG. 4. The oscillations normally stop after a count to eight due to a "0" output from sub-interval counter 87 and a high level on the control signal line 14. The oscillations stop after the second count to eight during the master timing interval 80, because the high level is no longer present on line 14.

The channel counter 89 is reset at time 83 when a count of eight is reached and the waveform B is low. Thereafter, the channel counter 89 is clocked by every "1" output from the sub-interval decoder 88, and the channel counter counts the N successive channels, which are sixty-two in number in the present example. The channel decoder 90 has sixty-two output lines which are energized in sequence during the channel intervals shown by waveform D in FIG. 4. One output line from decoder 90 is used through gate 94 to permit operation of the tri-state driver 92 during a predetermined one such as number 2, of the sixty-two channel intervals. But, the driver 92 is enabled only during the sub-interval 78 (waveforms B and E) of the predetermined second channel interval, as determined by an enabling signal to gate 94 during outputs "1" through "5" of sub-interval decoder 88. When tri-state driver 92 is thus enabled, the actual high level or low level output from the driver is determined by the position of the manual command switch 50. The level transmitted on the control signal line 14 is responded to by a receive unit connected to the line 14 at another point along the line.

The receive portion of a combination transmit/receive unit according to FIG. 3 is wired to respond to a control signal occurring during a predetermined channel interval determined by the particular one of the channel decoder 90 outputs which is coupled through gate 99 to the data latch 97. For example, the data latch may be enabled during the channel 3 interval. But, the data latch 97 is enabled from gate 99 only during a narrow receive period of the predetermined channel. The receive period may be as shown by pulse 67 in waveform F of FIG. 4. The receive period is conveniently determined by a "3" output from sub-interval decoder 88 applied to gate 99. During the receive period 67 of channel 3, the control signal put on the control signal line by a remote transmit unit during a transmit period 78' is latched into the data latch 97. The output levels at Q and Q of the latch are set and maintained by the latch until the next time that channel counter 89 reaches channel 3 and an enable signal is applied from gate 99 to latch 97. If the same control high or low data level is present on line 98, the output of the latch will continue the same as it was. If a different control data level is present, the different level will be latched and maintained at outputs Q and Q. One of these outputs is connected to a semiconductor switch to control the battery current to a lamp or other load, as shown at 36 and 48 in FIG. 1.

The described vehicle multiplex system is one requiring a bus of only two conductors—a battery power conductor and a control signal line—with a common ground return through the vehicle body. A multiplex timing unit puts a timing waveform on the control signal line. Each transmit unit along the line transmits during an assigned channel interval. Each receive unit along the line receives during an assigned channel interval. A combination transmit/receive unit uses a common synchronizing apparatus to transmit on any one channel and receive on any other channel.

The described vehicle multiplex system is constructed so that in operation it does not generate radio-frequency interference (RFI) which could interfere with operation of a radio receiver on the vehicle. This is accomplished by the inclusion of the RFI filter 22 (FIG. 1) between the multiplex timing unit 20 and the control signal line 14, and also the RFI filter 82 (FIG. 3) between each transmit unit and the control signal line 14. These RFI filters are low-pass filters which block the high-frequency components of the square pulses produced by timing and transmit units from reaching the line 14. The corners of the pulses are somewhat rounded after passing through an RFI filter without any impairment of their effectiveness in the multiplex system.

The multiplex system is also constructed to operate properly in the presence of electrical noise present on and near the vehicle which is induced onto the control signal line 14 by motors, spark ignition, etc. During the periods when the multiplex timing unit 20 (FIG. 1) is applying a high or a low voltage level to the line 14, the impedance from the line to ground provided by the RFI filter 22 is so low, about 100 ohms, that noise coupled to the line cannot develop a significant noise voltage on the line. During the periods when the multiplex timing unit driver 70 (FIG. 2) is disabled, the transmit units are enabled and then there is a higher impedance such as 7,000 ohms on the line 14. However, the low-pass filters 83 (FIG. 3) at the input of each receive unit attenuate noise voltage spikes on line 14 that would otherwise pass to and through Schmitt trigger 84 to data latch 97.

An additional immunity to false actuation of a receive unit by noise on line 14 is provided by the fact that the gated oscillator 86 (FIG. 3) is turned "on" when a negative-going transition in the synchronizing waveform B (FIG. 4) coincides with a "0" output from sub-interval counter 88. A noise transition at any other time when there is no "0" output from counter 88 cannot start the gated oscillator. And, the gated oscillator continues running and cannot be stopped until there again is a "0" output from counter 88 and a high level in the synchronizing waveform B (FIG. 4). The gated oscillator is both started and stopped when the impedance of the control signal line is low, so that the noise voltages on the line are low.

The power supply circuit 17 in FIG. 3 rectifies the control signal waveform B (FIG. 4) on the control signal line 14, 15 and supplies a $V_{DD}$ voltage of about +4 volts, and a $V_{SS}$ voltage of zero volts, to all electronic circuits in the transmit/receive unit shown in FIG. 3. The diode 31 and capacitor 33 are included in the power supply circuit to provide the $V_{SS}$ voltage of zero volts, instead of merely getting the $V_{SS}$ voltage from a ground connection. This is done to provide a fail-safe operation in case the N transistor of tri-state driver 92 becomes shorted, and shorts the control line 15 to $V_{SS}$. In the absence of a capacitor 33, the control line 15 is then shorted to ground, and the entire system is disabled. With the capacitor 33 present in the circuit, the capacitor is charged through diode 31 to the average potential of line 14, 15, which is about 2.9 volts. Then, while the transmit/receive unit containing the shorted tri-state driver remains inoperative, any other operative transmit unit can put a control signal on the line 14 which will have a high level reduced from about 4 volts to about 3.4 volts, and a low level increased from about zero volts to about 1.4 volts. However, an intended receive unit can reliably respond to these changed control signal levels. In a similar manner, the diode 41 and capacitor 44 operate like the diode 31 and capacitor 33 to provide the fail-safe feature if the P driver shorts to $V_{DD}$. In this case, the resistor 44, shown in FIG. 1 for supplying some of circuit bias power from the 12-volt power line 12, should have a higher value, or be omitted.

What is claimed is:

1. A vehicle multiplex system, comprising
   a power conductor for conveying electrical power to power-operated units on the vehicle,
   a signal conductor,
   a multiplex timing unit for applying a tri-state timing waveform to said signal conductor, said waveform including a master timing interval followed by a plurality of sequential channel intervals, each channel interval including a control time period during which the timing unit allows the voltage on the signal conductor to float,
   a plurality of control signal transmitters each operative in response to a physical command to apply a corresponding control signal to the signal conductor during a control time period in a channel interval assigned to the transmitter, and
   a plurality of control signal receivers each operative to control the connection of electrical power from the power conductor to a power-operated unit in response to a control signal received from the signal conductor during a control time period in a channel interval assigned to the receiver.

2. A vehicle multiplex system according to claim 1 wherein said multiplex timing unit includes an oscillator, a sub-interval counter and logic operated from said oscillator to generate said timing waveform during each channel interval, and a channel interval counter and logic operated from said first counter to generate said timing waveform during each master timing interval.

3. A vehicle multiplex system according to either claim 1 or 2 wherein each of said control signal transmitters includes a gated oscillator which is turned on by transitions of one polarity in said timing waveform, channel sub-interval counter means responsive to the output of said oscillator to define a transmit interval during each channel interval, and channel interval counter means responsive to an output of said sub-interval counter to enable the transmittal of a control signal to the signal conductor during a predetermined channel interval assigned to the respective control signal transmitter.

4. A vehicle multiplex system according to either claim 1 or 2 wherein each of said control signal receivers includes a gated oscillator which is turned on by transitions of one polarity in said timing waveform, channel sub-interval counter means responsive to the output of said oscillator to define a receive interval during each channel interval, and channel interval counter means responsive to an output of said sub-interval counter to enable the reception of a control signal from the signal conductor during a predetermined channel interval assigned to the respective control signal receiver.

5. A vehicle multiplex system according to claim 3 wherein a control signal transmitter and a control signal receiver share a single gated oscillator, a single sub-interval counter means and a single channel interval counter means.

6. A vehicle multiplex system according to claim 1, and in addition the inclusion of low-pass filters between said multiplex timing unit and said signal conductor, and between said transmit unit and said signal conductor, to prevent the application of radio-frequency components to said signal line.

7. A vehicle multiplex system according to claim 1, wherein the multiplex timing unit couples said timing waveform to said signal conductor at a low impedance which suppresses the induction of noise voltages on the signal conductor.

8. A vehicle multiplex system according to claim 1 wherein each of said control signal receivers includes a low-pass filter, and a Schmitt trigger which is responsive to a received control signal and is relatively unresponsive to noise on the signal conductor.

9. A vehicle multiplex system according to claim 1 wherein at least one of said control signal transmitters includes a tri-state driver for applying control signals to the signal conductor, and includes fail-safe diode and capacitor means to prevent a short circuit in said driver from disabling the entire multiplex system.

10. A vehicle multiplex system according to claim 4 wherein a control signal transmitter and a control signal receiver share a single gated oscillator, a single sub-interval counter means and a single channel interval counter means.

* * * * *